United States Patent [19]
Wahl

[11] 3,928,116
[45] Dec. 23, 1975

[54] AUTOMATIC DECAL APPARATUS

[75] Inventor: Albert J. Wahl, Fredonia, N.Y.

[73] Assignee: Commercial Decal, Inc., Mount Vernon, N.Y.

[22] Filed: Mar. 12, 1974

[21] Appl. No.: 450,295

[52] U.S. Cl. ............... 156/447; 156/230; 156/493; 156/540; 156/556; 156/574
[51] Int. Cl. ............................................. B65c 3/10
[58] Field of Search ........... 156/540, 541, 542, 556, 156/566, 574, 572, 569, 493, 486, DIG. 10, 447, 446, 568, 230, 240, 234

[56] References Cited
UNITED STATES PATENTS

| | | | |
|---|---|---|---|
| 2,324,411 | 7/1943 | Miller et al. | 156/230 |
| 3,309,256 | 3/1967 | Warsager | 156/230 |
| 3,455,758 | 7/1969 | Straughan | 156/215 |
| 3,616,078 | 10/1971 | Howard | 156/486 |
| 3,783,076 | 1/1974 | Wetzig | 156/234 |

Primary Examiner—Charles E. Van Horn
Assistant Examiner—Michael W. Ball
Attorney, Agent, or Firm—Lerner, David, Littenberg & Samuel

[57] ABSTRACT

Apparatus is provided for transferring decalcomanias to objects to be decorated therewith, said apparatus including a frame, a chuck or mandrel mounted on the frame for holding the object to be decorated, a carriage movably mounted on the frame with respect to the chuck for holding a decalcomania in a releasable position, means for reciprocally moving the carriage with respect to the chuck whereby the decalcomania will be passed in transfer relation to the object to be decorated, and means connected between said chuck and said carriage for rotating said chuck in response to movement of the carriage. Thus, when the object to be decorated is mounted on the chuck and the carriage is moved, the linear velocity of the periphery of said object will correspond to the linear velocity of the carriage.

The above-described apparatus is especially adapted for transferring decalcomanias to objects having a non-uniform periphery.

10 Claims, 4 Drawing Figures

AUTOMATIC DECAL APPARATUS

FIELD OF THE INVENTION

The present invention relates to an improved apparatus for transferring decalcomanias to objects to be decorated therewith, including objects which have a non-uniform periphery, such as pots, pans, cups, bowls, mugs and the like formed of glass, porcelain, porcelain on steel, and the like.

BACKGROUND OF THE INVENTION

U.S. Pat. application Ser. No. 145,629 filed May 21, 1971, now abandoned discloses automatic decal transfer apparatus wherein the object to be decorated is held by air pressure, mechanical means, or the like, on a rotatable mandrel, and the transfer surface bearing the decal is passed in transfer relation therewith. This apparatus has performed excellently where the decal is to be applied to an object having a uniform periphery, such as a cylindrical cup. However, it has been found that when this apparatus has been employed for transferring a decalcomania to an object having a non-uniform periphery, it is most difficult to apply the decalcomania uniformly to the object and, in fact, gaps and creases frequently resulted.

BRIEF STATEMENT OF THE INVENTION

In accordance with the present invention, there is provided an improved apparatus for transferring decalcomanias to objects to be decorated therewith, said objects including those having a non-uniform periphery as well as those having a uniform periphery. The present apparatus overcomes the difficulties encountered in connection with the use of the apparatus disclosed in U.S. application Ser. No. 145,629, now abandoned, in that it is most advantageously employed for decorating objects having any type of non-uniform periphery.

The preferred embodiment of the instant invention for transferring decalcomanias to objects to be decorated therewith comprises a frame, first means, such as a chuck or mandrel, rotatably mounted on said frame for holding an object to be decorated, second means, such as a carriage, movably mounted on said frame with respect to said first means for holding a decalcomania in releasable position, third means, such as electrically, hydraulically or pneumatically controlled mechanical means for reciprocally moving said second means with respect to said first means whereby said decalcomania will be passed in transfer relation to said object and fourth means, such as a cam and cable-pulley system, connected between said first means and said second means for rotating said first means in response to movement of said second means.

In one embodiment of the invention, a cam having a periphery which is identical to the periphery of the object to be decorated (and the chuck on which it is held) is mounted for rotation with said first means, said cam comprising a portion of the aforementioned fourth means. The fourth means also includes connecting means having a first portion connected to said second means and a second portion wrapped about said cam. Thus, an object to be decorated held on said chuck will automatically "follow", that is, be rotated in direct response to travel of the second means (carriage) so that the linear velocity of the periphery of said object will correspond to the linear velocity of said second means which holds the decalcomania in releasable position. Thus, with the linear velocity of the object synchronized with the linear velocity of the carriage, the possibility of formation of gaps, stretches, or creases during the transfer of the decal to the object is prevented.

In one of the preferred embodiments of the apparatus of the invention, the first means is mounted on a first shaft and the cam is mounted on a second aligned shaft and one-way clutch means is provided for interconnecting the first and second shafts to permit simultaneous rotation of said first and second shafts only when the decalcomania held by said second means is being passed in transfer relation to the object to be decorated. The one-way clutch assures that during the return trip of the carriage, the chuck will not rotate, so that the object can be easily removed by the operator. In this embodiment, the first and second shaft and the one-way clutch means together constitute an assembly on one end of which is carried said first means (chuck) and on the second end of which is carried the cam. This embodiment may further include adjustment means for selectively fixing the angular position of said assembly with respect to the carriage.

In yet another embodiment to be later described, the aforedescribed assembly may be free to angularly oscillate in accordance with the peripheral outline of the object to be decorated.

DETAILED DESCRIPTION OF THE INVENTION

Figure 1:
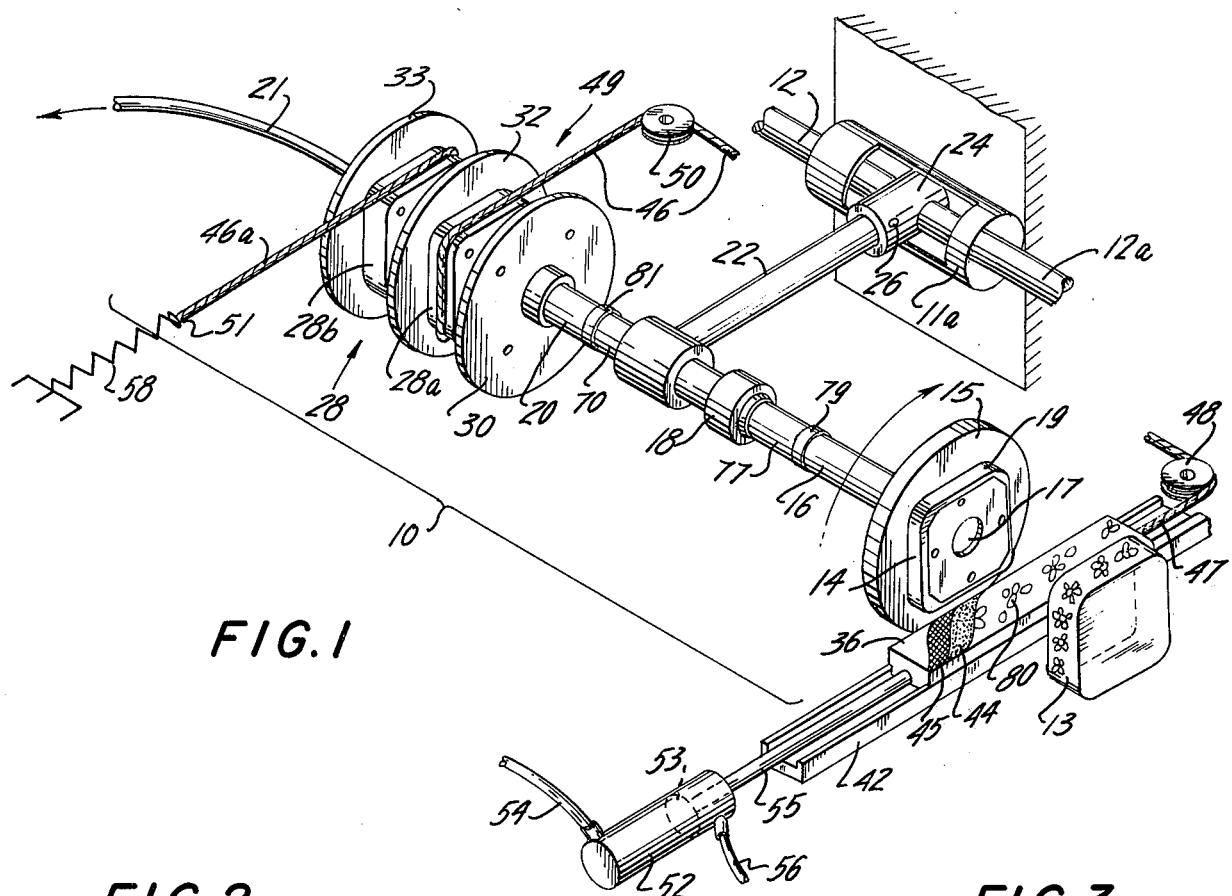
FIG. 1 represents a perspective view of a preferred embodiment of the apparatus of the present invention.

Referring to the Figures, FIG. 1 generally illustrates the working components of a preferred embodiment of the apparatus of the present invention as indicated by the numeral 10. The apparatus as shown includes a frame generally referred to by the numeral 12, a portion of which is cut away for drawing clarity. First means comprising a chuck or mandrel 14 configured to match the interior of the object 13 to be decorated is removably carried by a plate 15 and is rotatably mounted with respect to frame 12 as follows. The plate 15 is mounted on a first shaft 16, which shaft is connected with one-way clutch mechanism 18 to be described below. A second shaft 20 is also connected with said one-way clutch mechanism 18. As will be understood, one-way clutch mechanism 18 interconnects said first and second shafts to permit simultaneous rotation of these shafts only when rotation of these shafts is in one direction, the purpose of which will become further apparent.

The shafts 16 and 20 are hollow shafts with one end of shaft 20 being connected to a conduit 21 which in turn is connected to a source of reduced pressure, such as a vacuum pump. The chuck 14 includes an opening 17 in communication with the hollow portion of shaft 16.

Thus, with the aid of a vacuum, the chuck 14 is adapted to receive and hold in place the object to be decorated identified generally by the numeral 13 in FIG. 1. The outer surface 19 of the chuck 14 may be composed of a resilient material such as a rubber or other resilient material, which will provide a vacuum seal to objects placed thereon so that the object will be held in fixed relation to the chuck 14.

The frame 12 includes a fixed horizontally disposed cylindrically shaped portion 11a which is adapted to rotatably receive bar or portion 12a of the frame 12. Portion 12a of the frame is slotted so as to receive bar means 22 and collar 24. The portion 12a of frame 12 is adapted to rotate clockwise or counter-clockwise in portion 11a. In this manner the position of the working components 10 of the apparatus of the invention, namely bar means 22, first and second shafts 16, 20 together with the chuck 14 can be fixed at any desired position with respect to the carriage 36 to ensure that object 13 will be in optimum contact with the decal carried thereby.

The bar 22, as shown, is, optionally, angularly rotatable within collar 24 carried by frame 12. Collar 24 includes set or adjusting screw 26 or other conventional means for fixing bar means 22 in collar 24. Thus, by rotating bar means 22 about its own axis within collar 24, the assembly including the first and second shafts 16, 20 together with chuck 14 may be fixed at any desired position with respect to the carriage 36 to be described below to ensure that object 13 will be in optimum contact with the decal carried thereby.

Figure 4:
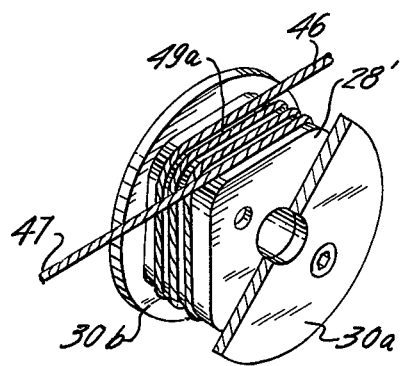
FIG. 4 represents an alternate embodiment of a portion of the apparatus shown in FIG. 1.

As seen in FIG. 1, cam 28 comprises portions 28a and 28b and is mounted on shaft 20 between plates 30, 32 and 33 as shown. Alternatively, as shown in FIG. 4, cam 28 can comprise a single cam 28 mounted on shaft 20 between plates 30a and 30b. Unless specified, hereinafter the cam 28 can comprise either of the embodiments shown in FIGS. 1 and 4.

Carriage 36 is movably mounted with respect to frame 12, specifically on guide means 42 so that it can be reciprocally moved with respect to chuck 14.

As described in application Ser. No. 145,629, now abandoned, carriage 36 is a horizontally movable member and comprises a porous resilient member 44, such as a strip of felt, which is, in turn, supported by supporting member 45, such as a wire gauze, a perforated plate, or the like. As described in U.S. application Ser. No. 145,629, the carriage 36 is a box-like housing which is connected to a pressure reducing means, such as a vacuum pump (not shown). When the pressure on the interior of the box-like carriage 36 is reduced, atmospheric pressure is exerted downwardly on the top surface of the resilient porous member 44 and holds in position any object placed thereon, such as a decalcomania 80, without danger of movement of slippage under normal transfer conditions. The resilience of the transfer surface, that is, the porous resilient surface, serves to insure a smooth and wrinkle-free transfer. It will also be appreciated that decalcomanias to be placed on the transfer surface, that is, on the porous resilient surface 44 of the carriage 36 can be held in place by mechanical means as well.

Also shown in FIG. 1 is a cable-pulley system wherein cable 46 guided by pulleys 48, 50 has one portion 47 connected to carriage 36, an intermediate portion 49 wrapped about such cam 28 and an end portion 51 connected to tension spring 58.

It will be appreciated that in the FIG. 1 embodiment, the intermediate portion 49 would actually constitute the respective ends of the cables 46, 46a which are wrapped about and fixed with respect to the cam halves 28a and 28b. In the FIG. 4 embodiment, the intermediate portion 49a actually comprises a non-severed portion of the cable 46. The driving means 52 may take the form of any conventional means such as a piston-operated cylinder 52 wherein pneumatic pressure is applied to opposite sides of the piston 53 via conduits 54 or 56 to move the piston rod 55 forward or backward and thereby cause reciprocal movement of said carriage 36. It will also be understood that the driving means 52 can also comprise electrically operated or mechanically operated means for causing reciprocal movement of the carriage 36. Inasmuch as the following movement of the cable 46 also causes rotation of the cam 28 and thus, rotation of the shaft 20, the shaft 16 and the chuck 14, it is seen that the linear velocity of the chuck as it rotates corresponds to the linear velocity of the movement of said carriage 36. As pointed out above, this will provide synchronized linear motion of the carriage 36 and the object being decorated and prevent gaps and creases in the decal 80 as it is transferred therebetween.

It will be appreciated that the tension spring 58 takes up the slack in the cable 46 when the carriage is returned to its initial position.

Figure 2:
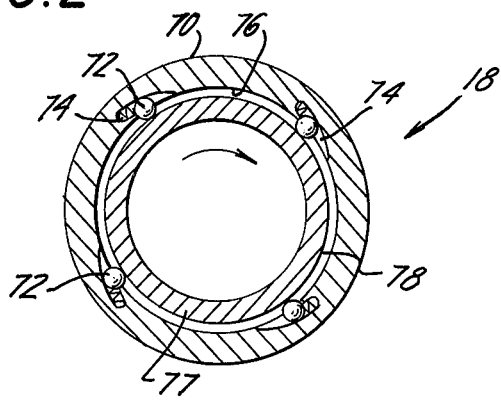
FIGS. 2 and 3 represent sectional views of one embodiment of a one-way clutch mechanism employed in the apparatus shown in FIG. 1.
Figure 3:
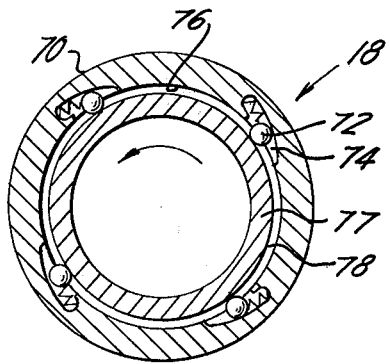

The one-way clutch mechanism 18 can comprise any conventional clutch mechanism. An example of one clutch mechanism is shown in FIGS. 2 and 3 comprises a drum 70 fitted with a plurality of spring loaded bearings 72 located in slots 74 provided along the inner periphery 76 of said drum and which cooperate with an inner ring 77. As can be seen in FIG. 1, the inner ring 77 is connected to shafts 16 and 20 via collars 79 and 81, respectively. The one-way clutch mechanism 18 operates as follows. As the shaft 20 rotates in a clockwise direction as shown in FIG. 2, the spring loaded bearings 72 engage the outer surface 78 of said ring 77 causing shaft 16 to rotate. However, where the shaft 20 rotates in a counter-clockwise direction, as shown in FIG. 3, the spring loaded bearings 72 are forced into the slots 74 thereby removing the driving means for rotating the shaft 16. In this manner, when the carriage is being moved passed the object to effect decal transfer, the cam 28 and the object 13 will be connected through the clutch for simultaneous "following action" pursuant to the motion of the cable. However, during the return stroke of the carriage, the one-way clutch assures that the object will not be rotated and can easily be removed by the operator.

The apparatus as shown in FIG. 1 operates as follows. An object, such as a ceramic bowl having a generally square peripheral configuration, as shown in FIG. 1, is decorated as follows. The object is placed into contact with the chuck 14, the peripheral configuration of which matches the interior configuration of the object and is held in position by means of atmospheric pressure in conjunction with the vacuum applied via conduit 21 through the shafts 20, 16. The position of the object 13 with respect to the carriage 36 is adjusted by selectively fixing the angular position of said assembly (comprising first shaft 16, the second shaft 20 and one-way clutch mechanism 18) with respect to said frame by rotating portion 12a of the frame 12 to the desired position. If desired, the position of the assembly may also be fixed by rotating the bar means 22 in the collar 24 to the desired position and setting or fixing the set screw 26. The precise position of the chuck 14 with respect to the carriage 36 will be in the desired transfer relationship with respect to the resilient transfer surface 44 of the carriage 36 and the decal 80 which has been placed thereon. Preferably, a mechanical arm (not shown for drawing clarity) lifts a decal from a stack of such decals and places it on transfer surface 44 of carriage 36. The drive means 52 is activated to move the carriage 36 past the object to be decorated thereby effecting transfer of the decal as described in U.S. Ser. No. 145,629. Movement of the carriage 36 pulls the cable 46, which, being wrapped about cam 28, in turn, causes rotation of the cam 28. This rotation is transferred through the shaft 20, the shaft 16 to the chuck 14 and the object held thereon so that the chuck 14 and object necessarily rotate in direct response and proportional to the linear incremental motion of the carriage 36.

During rotation, the object 13 to be decorated contacts the decals 80 positioned on the carriage 36. If, for example, the decals are of the "heat release" type, and if the object 13 to be decorated is heated to, or above the heat release temperature of the decal, the design layer of the decal will transfer to the object smoothly and evenly without the necessity of any manual adjustment. with the movement of the carriage 36 from right to left, powered by the drive means 52, the object 13 is rolled along the decal surface and the transfer is made. Thereafter, the object, with the decal in place thereon, is treated by conventional techniques to permanently affix the decal to the object.

As noted during the return stroke, when the drive means 52 returns the carriage to its initial position, the clutch means disconnects the chuck to permit the operator to remove the object and the spring 58 takes up the slack in the cable 46.

In another embodiment of the present invention, the assembly formed by the shafts 20, 16 and the chuck 14 and associated cams is free to oscillate in accordance with the peripheral outline of the object to be decorated. In this embodiment, the set screw 26 is removed so that the rod means 22 is free to rotate within the collar 24. To insure the desired oscillation of the assembly, guide means in the form of pulley 50 is positioned to guide the cable 46 over the top of the cam 28 so that the cam 28 will be lowered (actually rotated counter-clockwise about bar means 22) and the chuck 14 with the object thereon will be raised whenever a larger diametered portion of the object begins to contact the transfer surface.

It will be appreciated that the cam 28 will have the mean periphery with that of the object to be decorated. Thus, the chuck and cam can be changed so that the apparatus can be employed for transferring decalcomanias to objects having any peripheral configuration.

What is claimed is:

1. Apparatus for transferring decalcomanias to objects to be decorated therewith; said apparatus comprising:
 a frame;
 first means rotatably mounted on said frame for holding an object to be decorated, said object having a predetermined shape;
 second means movably mounted on said frame with respect to said first means for holding a decalcomania in releasable position;
 third means for reciprocally moving said second means with respect to said first means whereby said decalcomania will be passed in transfer relation to said object; and
 fourth means connected between said first means and said second means for rotating said first means in direct response to movement of said second means, said fourth means comprising a cam having said predetermined shape of said object, said cam being mounted for rotation with said first means, and connecting means having a first portion connected to said second means and a second portion wrapped about said cam, whereby the velocity of said periphery of said object will correspond to the velocity of said second means.

2. The apparatus of claim 1 and wherein said first means is mounted on a first shaft; said cam is mounted on a second shaft; and further including one way clutch means interconnecting said first and second shafts to permit simultaneous rotation of said first and second shafts only when said decalcomania is being passed in transfer relation to said object.

3. The apparatus of claim 1 and further including a second cam of said predetermined shape mounted for rotation with said first means; and further including second connecting means one end of which is wrapped about said second cam and the other end of which is connected to one end of an expansible spring, the second end of which is connected to said frame.

4. The apparatus of claim 1 wherein a third end portion of said connecting means is connected to one end of an expansible spring, the other end of which is secured to said frame.

5. The apparatus of claim 1 wherein said first means and said cam are mounted on opposite ends of an assembly pivotally movable with respect to said frame about an axis intermediate of said opposite ends; and further including guide means for guiding said connecting means over the top of said cam whereby said first means will oscillate in accordance with the peripheral outline of said object.

6. The apparatus of claim 1 wherein said first means comprises a vacuum chuck configured to match the interior of the object to be decorated.

7. The apparatus of claim 2 wherein said first shaft, said second shaft, and said one way clutch means together constitute an assembly on one end of which is carried said first means and on a second end of which is carried said cam; and further including adjustment means for selectively fixing the angular position of said assembly with respect to said frame.

8. The apparatus of claim 2 wherein a third end portion of said connecting means is connected to one end of an expansible spring, the other end of which is secured to said frame.

9. The apparatus of claim 2 wherein a second cam of said predetermined shape mounted for rotation with said first means; and further including second connecting means one end of which is wrapped about said second cam and the other end of which is connected to one end of an expansible spring, the second end of which is connected to said frame.

10. The apparatus of claim 5 and further including one way clutch means interconnecting said first means and said cam to permit simultaneous rotation of said first means and said cam only when said decalcomania is being passed in transfer relation to said object.

* * * * *